United States Patent

[11] 3,623,456

| [72] | Inventor | Marvin J. Priefert<br>R.R. 1, Mt. Pleasant, Tex. 75455 |
|---|---|---|
| [21] | Appl. No. | 51,823 |
| [22] | Filed | July 2, 1970 |
| [45] | Patented | Nov. 30, 1971 |

[54] CHUTE GATE
5 Claims, 7 Drawing Figs.

[52] U.S. Cl. ........................................... 119/98, 119/99
[51] Int. Cl. .......................................... A61d 03/00
[50] Field of Search .......................... 119/98, 99, 147

[56] References Cited
UNITED STATES PATENTS

| 2,678,631 | 5/1954 | Hagar | 119/99 |
| 2,842,098 | 7/1958 | Sudheimer | 119/99 |
| 3,245,383 | 4/1966 | Priefert | 119/98 |

*Primary Examiner*—Hugh R. Chamblee
*Attorney*—Rudolph L. Lowell

ABSTRACT: The chute gate is attachable to a cattle chute that has a pair of animal-neck-engaging members supported on a main frame for simultaneous vertical movement and lateral movement toward and away from each other within the transverse confines of the main frame. Movement of the neck-engaging members is accomplished through a manually operated lever system.

PATENTED NOV 30 1971 3,623,456
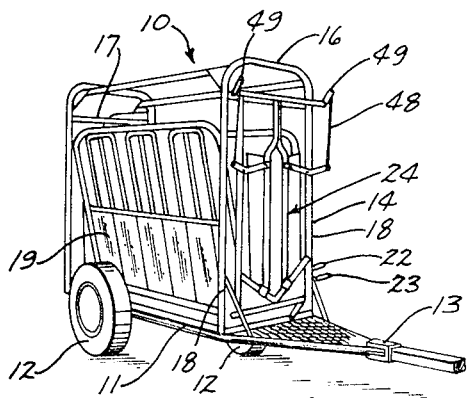
Fig. 1
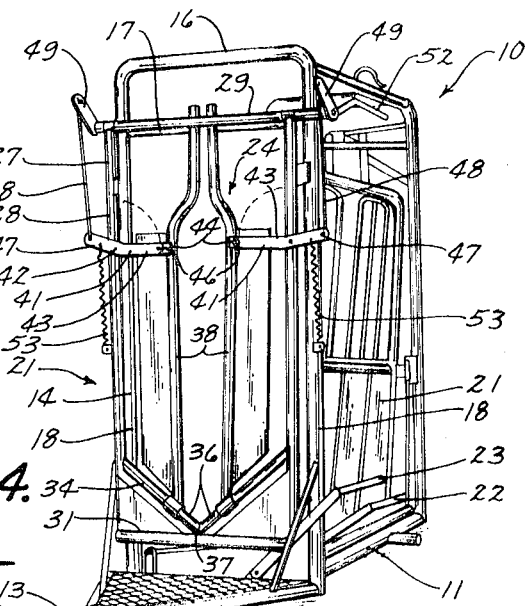
Fig. 2
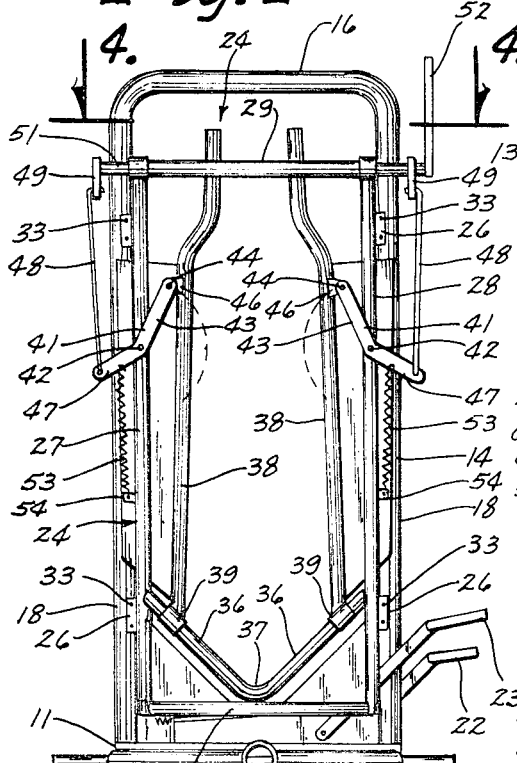
Fig. 3
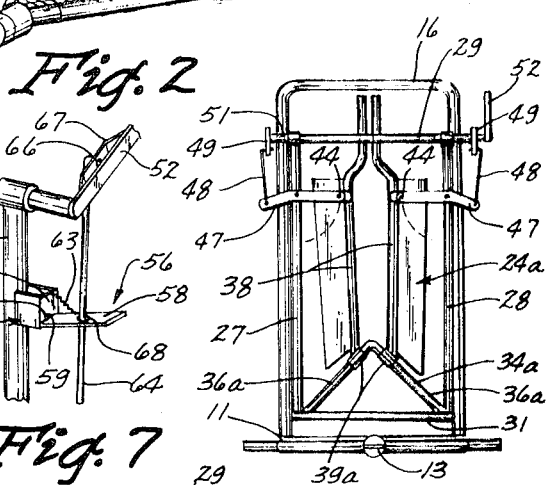
Fig. 7
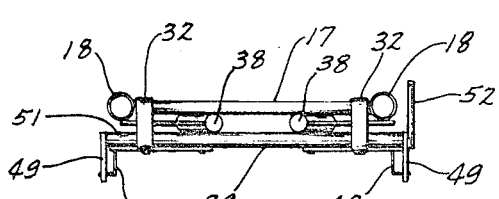
Fig. 4
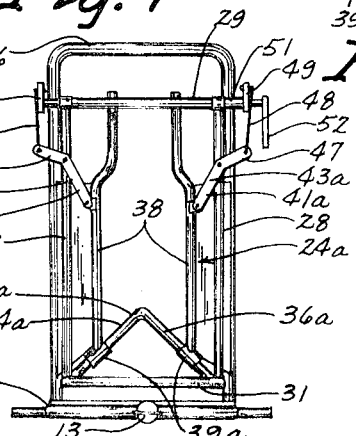
Fig. 5
Fig. 6
INVENTOR
MARVIN J. PRIEFERT
BY Rudolph L. Lowell
ATTORNEY

CHUTE GATE

SUMMARY OF THE INVENTION

The chute gate is of a compact and rugged construction, light in weight and capable of being easily installed on different type chutes. Animals of varying sizes can be safely handled and are released or held by manipulation of a single lever located to one side of the chute gate.

BRIEF DESCRIPTION OF THE DRAWINGS

FIG. 1 is a front perspective view of a portable cattle chute equipped with the chute gate of this invention;

FIG. 2 is an enlarged front perspective view of the portable cattle chute of FIG. 1 shown in operating position with the chute gate closed;

FIG. 3 is an enlarged front elevational view of the chute gate in an open position;

FIG. 4 is a sectional view as seen on the line 4—4 in FIG. 3;

FIG. 5 is a front elevational view of a modified form of chute gate shown in a closed position;

FIG. 6 is illustrated similarly to FIG. 5 and shows the chute gate in an open position; and FIG. 7 is a perspective view, with some parts broken away, of a locking mechanism for the chute gate of either FIG. 1 or FIG. 5.

DETAIL DESCRIPTION OF THE INVENTION

With reference to the drawing, there is shown in FIGS. 1 and 2 of a portable cattle chute 10 of a type referred to as a squeeze chute, and including a base frame or chassis 11 of an open construction equipped with removable ground wheels 12. A tongue structure 13 formed as a front extension of the base frame 11 is attachable to a towing vehicle (not shown). An upright frame 14 at each end of the main frame 11 is of a substantially inverted U shape with a curved top section 16 and an upper connecting crossbar 17 spaced downwardly from the top section 16. The legs 18 of an end frame 14 constitute upright posts that are suitably secured at their lower ends to the base frame 11. The chute 10 includes further side frames 19 and 21 with the side frame 21 being movable toward and away from the side frame 19, and hingedly connected to one of the upright posts 18 for outward swinging movement. Lateral movement of the side frame 21 is provided by actuation of a foot lever 22, with a foot lever 23 controlling the swinging movement of the side frame 21. Since the operation of the side frames 19 and 21 form no part of the present invention they will not be described in detail.

The chute gate of this invention, indicated generally at 24 in FIGS. 1 and 2, may be operatively associated with each of the end frames 14 and is secured to the posts 18 of an end frame by mounting brackets 26. The gate 24 includes an upright rectangular-shaped frame 27 having a pair of vertical side members 28 connected together by upper and lower transverse bars 29 and 31, respectively. As best appears in FIG. 4, the upper transverse bar 29 is secured to the top ends of the side members 28 by horizontal mounting plates 32 which also function to connect the side members 28 to the upper transverse bar 17. The mounting brackets 26, as shown in FIG. 3, are carried on the side members 28 for securement to the posts 18 as by bolts 33.

Positioned within the plane of the upright frame 27 and at the lower end thereof is a transverse angulate member 34 of a V shape having leg sections 36 attached at their free ends to corresponding ones of the upright side members 28 and an apex portion 37 secured to the central portion of the lower bar 31.

Arranged between the side members 28 is a pair of upright animal-neck-engaging members or rods 38. Each rod 38 is provided at its lower end with a tubular bearing or sleeve member 39 which is mounted about and slidably movable longitudinally of a corresponding leg 36 of the V-shape member 34. The upper end portions 41 of the rods 38 are extended (FIG. 4) within the space provided between the crossbar 17 of the end frame 14 and the upper bar 29 of the upright frame 27. The bars 17 and 29 thus form a guideway for vertically supporting the rods 38 while permitting relative lateral movement thereof. Lateral and vertical movements of the rods 38 take place simultaneously in response to the riding action of the rods longitudinally of the leg sections 36 of the V-member 34.

When the lower portions of the rods 38 are moved to their innermost positions adjacent to the apex 37 of the V-member 34 (as shown in FIG. 2) the rods are engageable with the neck of an animal located therebetween. These innermost positions define a closed position of the gate 24. Likewise, when the rods 38 are moved to their outermost positions, as shown in FIG. 3, the chute gate 24 is in its open position to provide for the free movement of an animal to pass through the gate between the rods 38, and over the V-member 34. In this connection it is to be noted that the upright frame 27, the V-member 34 and rods 38 are all of a tubular pipe construction so as to reduce possible injury to an animal striking thereagainst.

In order to move the rods 38 to the open and closed position of the gate 24, there is provided a pair of angulate levers or bellcranks 41 corresponding to the rods 38 and adjacent side members 28. Each lever 41 is pivotally connected at 42 to side bar member 28 adjacent the upper portion of the side member so as to extend transversely of the upright frame 27. The inner arm 43 of a lever 41 is pivotally connected at 44 to a tab 46 secured to a rod 38. The outer arm 47 of a lever 41 is pivotally connected to the lower end of an upright link 48 the upper end of which is pivotally connected to a rock arm 49 secured to a shaft 51 that is rotatably supported within the upper bar 29. The rockshaft 51 (FIGS. 3 and 4) projects laterally outwardly from opposite sides of the upright frame 27 with a rock arm 49 being secured to each projected end thereof. A handle 52 is mounted at one end of the rockshaft 51 so as to be located to one side of the chute 10.

When the gate 24 is in a closed position (FIG. 2) the inner arms 43 of the levers 41 are extended inwardly toward each other in a substantially horizontal plane. With the gate 24 in an open position, as shown in FIG. 3, the inner arms 43 are extended upwardly and inwardly of the upright frame 27. During movement of the rods 38 from gate-closing to gate-opening positions the pivot connections 44 define an arc, illustrated in dotted lines of FIG. 2, which corresponds substantially to the inclination of the legs 36 of the V-member 34. Thus, the rods 38 have their lower portions in a guidable relation with the V-member 34 and their upper portions guidably moved by the levers 41 such that the upper and lower end portions of each rod 38 move through substantially similar parallel paths. When the gate 24 is in a closed position any tendency of the rods 38 to move away from each other is effectively resisted by the alignment of the pivot connections 42 and 44 in a plane normal to the longitudinal axes of the rods 38, and the inclination of the sleeve members 39 relative to the longitudinal axes of the rods 38.

In use, an animal enters the rear of chute 10 between the side frames 19 and 21. At this time the gate 24 is partially closed so as to prevent the animal from moving through the chute 10 but with the neck-engaging members 38 spaced apart a distance sufficient to permit the head of the animal to pass therebetween. With the neck of the animal between the rods 38, the handle 52 is manipulated to rotate the rockshaft 51 which through the levers 41 and links 48 moves the rods 38 downwardly and inwardly toward each other to their positions in FIG. 2 for engagement with opposite sides of the neck of an animal. To release an animal it is only necessary to reverse the rotation of the rockshaft 51 whereby the rods 38 are moved to their outermost positions shown in FIG. 3. This movement is assisted by coil springs 53 connected in tension between the outer lever arms 47 and tabs 54 secured to the side members 28 at positions spaced below the pivot connections 42.

The modified form of the chute gate 24a shown in FIGS. 5 and 6 is similar in all respects to the chute gate 24 described in connection with FIGS. 1-1 except for the use of an inverted V-member 34a secured to the upright frame 27. Similar numerals of reference therefore will be used to designate like parts. The rods 38 are equipped with sleeve members 39a which are reversely inclined relative to the sleeve members 39 so as to accommodate the reversed inclination of the leg sections 36a of the angulate member 34a. The levers 41a are of an angulate construction pivotally supported at 42 on the side members 28.

When the rods 38 are in their innermost positions as shown in FIG. 5, the inner arms 43a of the lever 41a are extended horizontally towards each other, with the pivot connections 42 and 44 in linear alignment. However, when the rods 38 are to be moved to their outermost positions the inner arms 43a are rotated downwardly in response to the rotation of the rockshaft 51, to their positions shown in FIG. 6. As indicated in dotted lines in FIG. 5 the arcuate path of travel of the pivotal connections 44 define arcs having a substantially parallel relation with the corresponding leg sections 36a of the V-member 34a.

To releasably lock the gates 24 or 24a in an adjusted position against release by an animal held thereby, a lock mechanism 56 (FIG. 7) may be provided which includes a mounting bracket 57 secured to and extended laterally outwardly of a side member 28 at a position adjacent its upper end. The bracket is of a channel shape in transverse section having legs arranged in a generally straddling relation with the side member. A release and locking member 58 of a flat shape has a longitudinally projected ear 59 at one end receivable within an associated opening 61 formed in the web 62 of the bracket 57 for up and down pivotal movement. The member 58 is retained in the opening 61 by a coil spring 63 connected to the web 62 and the member 58.

A holding rod 64 has its upper end pivoted at 66 to a support member 67 secured to and extended longitudinally of the handle 52. From its pivoted end the rod 64 is loosely projected through an opening 68 formed intermediate the ends of the release and locking member 58. With the member 58 depressed against the action of the spring 63 the rod 64 is freely movable through the opening 68 to permit actuation of the chute gate 24 or 24a by the handle 52. On being released the locking member 58 is pivoted upwardly by the spring 63 into a binding engagement with the rod 64 at the opening 68 so as to positively lock the chute gate in a desired adjusted position.

Although the invention has been described with respect to preferred embodiments thereof, it is to be understood that it is not to be so limited since changes can be made therein within the full intended scope of this invention as defined by the appended claims.

I claim:
1. An animal-holding gate comprising:
  a. an upright main frame having a pair of transversely spaced side members,
  b. an angulate member extended between the lower portions of said side members and connected to said side members, said angulate member having a pair of reversely inclined body sections and a central apex portion,
  c. an upright animal-neck-engaging member corresponding to each body section having a lower end portion slidably connected to a body section for movement longitudinally thereof,
  d. an angulate lever corresponding to each neck-engaging member pivotally supported intermediate the ends thereof on a side member and having a first arm extended inwardly of the main frame and a second arm projected outwardly of the main frame,
  e. means pivotally connecting each of said first arms to a corresponding neck-engaging member, and
  f. means mounted on said main frame and connected to said second arms for moving said neck-engaging members vertically and laterally toward and away from each other into and out of an animal-neck-engaging position.

2. The animal-holding gate according to claim 1 wherein:
  a. said first arms are extended toward each other in substantially horizontal alignment when the neck-engaging members are in positions moved inwardly toward each other, with each of said first arms having a length such that the arc of movement of a pivotal connecting means defines a path corresponding substantially to and in a parallel relation with the angular inclination of one of said body sections.

3. The animal-holding gate according to claim 1 wherein:
  a. said upright main frame includes a top crossmember secured to said side members, and
  b. said means mounted on the main frame includes a transverse manually rotatable rockshaft rotatably mounted adjacent the upper ends of said side members in a spaced relation with said crossmember to form with said crossmember a guideway supporting the upper ends of said neck-engaging members for relative vertical and lateral movements, and
  c. rock arms on said rockshaft connected with said second arms of the angulate levers.

4. An animal-holding gate comprising:
  a. an upright main frame having a pair of transversely spaced side members,
  b. a V-shape member extended transversely between the lower portions of said side members having leg sections the free ends of which are connected to said side members,
  c. a pair of upright animal-neck-engaging members corresponding to said side members, each having the lower end portion thereof slidably connected to a leg section for movement longitudinally thereof,
  d. a pair of bellcrank members corresponding to said side members, each of which is pivotally supported on and adjacent to the upper end of a side member having a first arm extended inwardly of said main frame and a second arm projected laterally outwardly from said main frame,
  e. means pivotally connecting the free end of each said first arms to a corresponding neck-engaging member, and
  f. means mounted on said main frame and connected with the second arms of said bellcrank members to move said neck-engaging members vertically and laterally toward and away from each other along said V-member leg sections.

5. The animal-holding gate according to claim 4 wherein:
  a. said first arms of the bellcranks are extended toward each other in substantial linear alignment when the neck-engaging members are in the innermost positions therefor, and are extended upwardly and inwardly of the main frame when the neck-engaging members are in the outermost positions therefor, and
  b. each said pivotal connecting means, on movement of the neck-engaging members between the innermost and outermost positions therefor, defining an arcuate path corresponding substantially to the angular inclination of a leg section of said V-member.

* * * * *